United States Patent [19]

O'Neill et al.

[11] 4,058,198

[45] Nov. 15, 1977

[54] CONVEYOR ASSEMBLY

[75] Inventors: Patrick O'Neill; Patrick Joseph Douglas; Michael Lee Mallaghan, all of Dungannon, Ireland

[73] Assignee: Powerscreen International Limited, Dungannon, Ireland

[21] Appl. No.: 672,078

[22] Filed: Mar. 30, 1976

[30] Foreign Application Priority Data

Apr. 1, 1975 United Kingdom ............... 13176/75

[51] Int. Cl.² ............................................. B65G 21/12
[52] U.S. Cl. ..................................... 198/313; 198/314; 198/317; 198/589
[58] Field of Search .............. 198/313, 314, 316, 317, 198/318, 589; 212/59 R; 214/520, 521, 522

[56] References Cited

U.S. PATENT DOCUMENTS

| 1,015,939 | 1/1912 | Brunelle | 198/313 X |
| 1,110,239 | 9/1914 | Steever | 198/313 X |
| 2,632,556 | 3/1953 | Alpers et al. | 198/313 |
| 2,688,411 | 9/1954 | Bushong et al. | 212/59 R |
| 2,745,540 | 5/1956 | Smokeo | 198/313 |
| 2,759,591 | 8/1956 | Erickson | 198/318 X |
| 2,805,759 | 9/1957 | Manceau | 198/314 |
| 2,814,377 | 11/1957 | Jirak | 198/589 |
| 2,834,487 | 5/1958 | Gaddis | 198/313 X |
| 2,894,645 | 7/1959 | McCall et al. | 212/59 R |
| 3,494,489 | 2/1970 | Kruger | 212/59 R |
| 3,884,346 | 5/1975 | O'Neill et al. | 198/589 |

Primary Examiner—Evon C. Blunk
Assistant Examiner—Richard K. Thomson
Attorney, Agent, or Firm—Gerald J. Ferguson, Jr.; Joseph J. Baker

[57] ABSTRACT

A conveyor assembly comprises a main conveyor and a boom conveyor. A mounting is pivotally connected at the discharge end of said main conveyor for movement about a transverse axis relative to said main conveyor, said mounting having a rotatable support on which the boom conveyor is mounted for pivotal movement laterally. A linkage retains said mounting in a horizontal position extended outwardly beyond said discharge end with said rotatable support upright. The support has an attachment device at its upper end providing for pivotal connection about a transverse axis of said boom conveyor for movement thereof in a vertical plane, the boom conveyor being supported by a length-adjustable tie from said mounting. The linkage comprises a series of interconnected pivotal links between said mounting and said main conveyor to provide for synchronized adjustment of the mounting to maintain the support upright on alteration of the inclination of said main conveyor.

3 Claims, 2 Drawing Figures

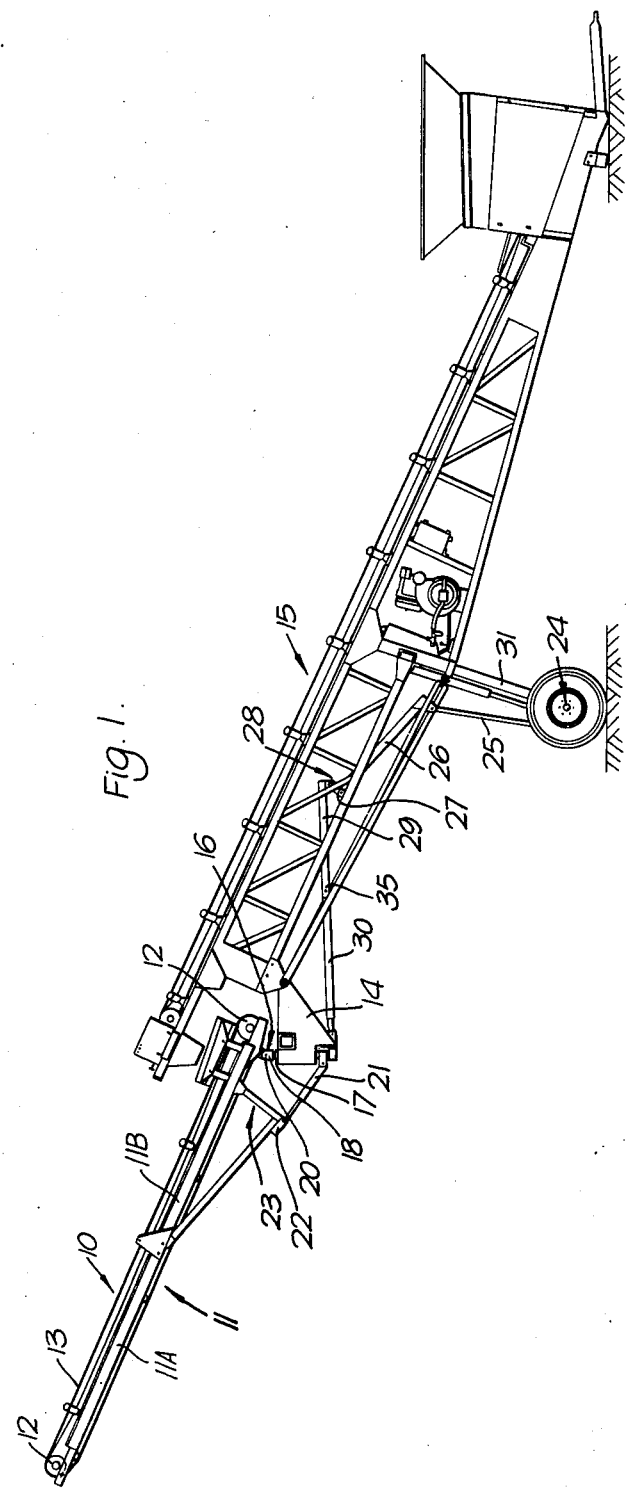

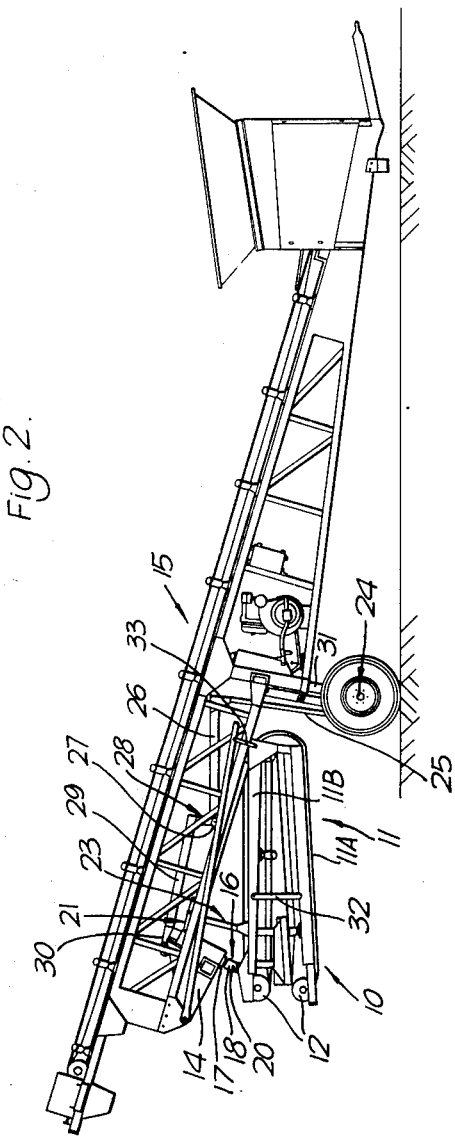

CONVEYOR ASSEMBLY

This invention relates to a conveyor assembly having a main conveyor and a discharge or off-loading end extension therefor, the main conveyor including an elongate support structure carried intermediate its ends by length-adjustable legs, extendable or retractable by a hydraulic ram, whose roots are carried on an axle transverse of said support structure, said axle having at each end a ground-engaging wheel, and a conveyor mounted on said support structure, the purpose of the discharge end extension being to enable said conveyor assembly to be used, without its location being changed, to convey discrete material being fed along or up said main conveyor to be discharged from the extension in one of several different angular locations in both the horizontal and vertical planes relative to the main conveyor, for example for stockpiling different grades of material in separate locations or for stockpiling material at one location and vehicle loading at another location.

The present invention is a conveyor assembly in which a discharge end extension is a boom conveyor having an elongate support structure, a conveyor mounted on said support structure, a main conveyor having under or subjacent to its delivery end a mounting pivotally connected thereto for movement about a transverse axis relative to said main conveyor, said mounting having supporting means to hold said mounting in a position extending outwardly beyond said discharge end and carrying uprightly a rotatable support to which said boom conveyor is mounted for movement in a lateral plane.

Preferably, the upper end of the rotatable support has attachment means to provide for pivotal connection about a transverse axis of said boom conveyor for movement thereof in a vertical plane, the boom conveyor being supported by a length-adjustable tie from said mounting.

Preferably, also, said supporting means comprises a series of pivoted links interconnecting said mounting at or adjacent to the bottom thereof to a stationary member of said main conveyor, said supporting means also serving to provide adjustment to maintain the rotatable support in an upright position if the main conveyor is raised or lowered by length-adjustment of the legs.

Alternatively, said supporting means is a length-adjustable connector.

Also, the rotatable support is preferably a rotary actuator.

Preferably also, the boom conveyor is movable between an in-use position and an out-of-use position, said in-use position being in which the boom conveyor extends beyond the discharge end of the main conveyor, and said out-of-use positions being in which the boom conveyor is accommodated under that part of the support structure of the main conveyor between the legs and the discharge end, the supporting means being disconnected to allow the mounting to pivot, under gravity, about its transverse axis to enable the boom conveyor to be moved into its out-of-use position.

An embodiment of the present invention will now be described, by way of example, with reference to the accompanying drawings, in which:

FIG. 1 is a side elevation of a conveyor assembly according to the present invention, in which a discharge end extension is in an in-use position; and, FIG. 2 is a side elevation of the conveyor assembly in which the discharge end extension is in an out-of-use position.

A conveyor assembly is provided in which a discharge end extension is a boom conveyor 10 having an elongate support structure for example a framewaork 11 carrying at least two transverse longitudinally spaced rollers 12, at least one of which, that is the one at the loading end, is driven by power means, for example an hydraulic motor (not shown), and a conveyor in the form of an endless belt 13 is entrained around said rollers 12.

A main conveyor 15 has under or subjacent to its discharge end a mounting 14 pivotally connected thereto for movement about a transverse axis relative to said main conveyor 15. The mounting 14 has supporting means to hold said mounting 14 in a position extending outwardly beyond said discharge end and carries uprightly a rotatable support, in this embodiment in the form of a rotary actuator 16, the upper end of which has attachment means to provide for pivotal connection of said boom conveyor 10 for movement about a transverse axis relative to said main conveyor 15. The attachment means comprises a bar 17 centrally mounted on said actuator 16 and having at each of two opposite ends an upstanding apertured lug 18, the apertures in said two lugs 18 being aligned and each respective side of the framework 11 of said boom conveyor 10 has a similar aperture provided in the framework 11. Each pair of apertures, one in the lug 18 and one in the framework 11, is engaged by a stub pin 20 secured against axial movement.

The boom conveyor 10 is supported from the mounting 14 by a length adjustable tie in the form of a hydraulic ram 21, being mounted between the bottom of the actuator 16 and an anchorage 22 provided below the boom conveyor 10 at the apex of an angled support frame 23 whose members are substantially at right angles to each other and extend from the anchorage 22 to adjacent to the loading end of said boom conveyor 10 and to adjacent mid-way of the length of the framework 11 thereof.

The supporting means comprises a series of pivoted links interconnecting said mounting 14 at its bottom to a stationary member of said main conveyor 15, namely the axle 24. The links comprise an upright 25 pivoted at its bottom en to said axle 24 and at its upper end pivoted to one end of a first link 26 extending towards the discharge end of the main conveyor 15, the other end of which is pivotally mounted to a stationary rod 27 transverse of the support structure of the main conveyor 15, said other end of the first link having a bell-crank arm 28 projecting upwardly and to the outer end of which one end of a second link 29 is pivoted. The second link 29 and a third link 30 are connected together for length-adjustment and, for example, are both tubular and the other end of the second link 29 and one end of the third link 30 are in sliding co-axial engatement, each engaged end of the links 29, 30 having a longitudinal series of diametrically opposed apertures, the second and third links, 29, 30 being lockable relative to each other by a pin 35 being located through diametrically opposed apertures of both links 29, 30 when aligned. The outer end of the third link 30 is pivotally connected to the mounting 14.

On increasing the angle of main conveyor 15; the angle between upright 25 and first link 26 increases because the end of link 26 pivotally mounted on stationary rod 27 rises with the conveyor 15 and pivots clockwise when viewed in FIG. 1. This pivotal movement of link 26 causes the bell crank arm 28 to pivot clockwise on rod 27 nd in doing so it draws the second and third links 29, 30 from left to right as viewed in FIG. 1. This movement of links 29, 30 pivots the mounting 14 anticlockwise thus altering the position of actuator 16 relative to the main conveyor such that the actuator remains vertical.

The boom conveyor 10 is movable between an in-use position and an out-of-use position, said in-use position being the position heretofore described in which the boom conveyor 10 extends outwardly from below the discharge end of the main conveyor 15. The out-of-use position is one in which the boom conveyor 10 is moved to underly the main conveyor 15 and is accommodated under that part of the support structure of the main conveyor 15 between legs 31 and the discharge end. The framework 11 may be in two articulated halves, the outer half 11A being foldable over on top of the inner half 11B and secured in saidd position by a tie 32, chain or the like, the part of the angle support frame 23 being rooted to the inner half 11B adjacent to the articulation. To allow the boom conveyor 10 to be moved to an out-of-use position, the supporting means is disconnected by the pin 35 locking the second and third links 29, 30 being removed and one link being withdrawn from sliding engagement with the other. The mounting 14 and the folded over boom conveyor 10 pivot downwards under gravity about the mounting's transverse axis and the outer end of the inner half 11B of the boom conveyor 10 is secured by a tie 33, chain or the like, to the support structure of the main conveyor 15.

The conveyor assembly of the present invention can be transported with the boom conveyor 10 in its foldaway out-of-use position and on being positioned on site, the boom conveyor 10 can be pivoted upwardly by using a crane or like lifting apparatus and when roughly in position and sill supported, the second and third links 29, 30 are located for sliding movement and pinned at the required position as hereinbefore described, the supporting can then be removed and the outer half of the framework 11 folded over into position. The rotary actuator 16 is hydraulically driven, and together with the hydraulic ram 21 for the boom conveyor 10 is fed with fluid from the hydraulic fluid supply tank for the conveyor assembly. If the legs 31 of the main conveyor 15 are length-adjusted by lengthening or shortening them, the distance of the upper end of the main conveyor 15 off the ground is increased or decreased accordingly and the position of the actuator 16 would thereby be altered but for the supporting means as above-described providing synchonised adjustment of the position of the actuator 16 to maintain it in an upright position. The boom conveyor 10 can be swivelled in a lateral plane by rotatable movement of the actuator and can be moved in a vertical plane by extension or retraction of the hydraulic ram 21.

The framework 11 of the boom conveyor 10 can be in one piece and in such case, the legs 31 are fully length-extended to allow for the pivotal movement of the boom conveyor 10, and the distance between the legs 31 and discharge end of the support structure of the main conveyor 15 is slightly greater than the length of the framework 11 of the boom conveyor 10 to accommodate same thereunder.

In a simplified modification, the supporting means may be a length-adjustable connector (not shown), for example a hydraulic ram or two links in sliding engagement similar to the second and third links 29, 30 above described. In this case, the actuator 16 is only maintained upright, with length-adjusting of the legs 31, by length-adjusting the connector thereby requiring the boom conveyor 10 to be supported during such operation.

We claim:

1. A conveyor assembly comprising a main conveyor, a boom conveyor unit comprising an elongate support structure and a conveyor mounted in said support structure, a mounting pivotally connected at the discharge end of said main conveyor for movement about a transverse axis relative to said main conveyor, a rotatable support on said mounting to which said boom conveyor unit is mounted for movement in a lateral plane, and a linkage adapted to synchronously alter the position of the mounting relative to the main conveyor on alteration of the angle of inclination thereof, said linkage comprising an upright support member having one end connected to a part of the main conveyor which does not vary in height off the ground, and having its other end pivotally connected to a first link, said first link being angularly disposed relative to said upright support member in a direction towards the discharge end of the main conveyor, and pivotally connected at its other (forward) end to a location on the main conveyor which varies in height on alteration of the inclination of the main conveyor, a bell crank arm mounted on said location of variable height and having a fixed position relative to the first link, and a connecting rod pivotally connected to the bell crank in the mounting.

2. A conveyor assembly according to claim 1, wherein attachment means at the upper end of the rotatable support provides for pivotal connection about a transverse axis of said boom conveyor unit for movement thereof in a vertical plane, the boom conveyor unit being supported by a length-adjustable tie from said mounting.

3. A conveyor assembly according to claim 1, wherein the boom conveyor unit is movable between an in-use position and an out-of-use position, said in-use position being in which said boom conveyor unit extends beyond the discharge end of said main conveyor, and said out-of-use position being in which said boom conveyor unit is accommodated under part of the main conveyor adjacent to the discharge end, the supporting means being disconnected to allow the mounting to pivot, under gravity, about its transverse axis to enable said boom conveyor unit to be moved into its out-of-use position.

* * * * *